US007540973B2

(12) United States Patent
Bartelt

(10) Patent No.: US 7,540,973 B2

(45) Date of Patent: Jun. 2, 2009

(54) AZEOTROPE-LIKE MIXTURES COMPRISING HEPTAFLUOROCYCLOPENTANE

(75) Inventor: Joan Ellen Bartelt, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/952,469

(22) Filed: Dec. 7, 2007

(65) Prior Publication Data

US 2008/0139444 A1 Jun. 12, 2008

Related U.S. Application Data

(60) Provisional application No. 60/874,365, filed on Dec. 12, 2006.

(51) Int. Cl.
*C09K 5/04* (2006.01)
*C11D 7/50* (2006.01)

(52) U.S. Cl. ............................ 252/67; 252/68; 252/69; 252/364; 510/177; 510/408; 510/415

(58) Field of Classification Search .................. 252/67, 252/68, 69, 364; 510/177, 408, 415
See application file for complete search history.

(56) References Cited

U.S. PATENT DOCUMENTS

| | | | | |
|---|---|---|---|---|
| 5,196,137 | A | 3/1993 | Merchant | |
| 6,274,543 | B1 * | 8/2001 | Milbrath et al. | 510/412 |
| 6,291,416 | B1 * | 9/2001 | Michaud et al. | 510/411 |
| 6,312,759 | B1 | 11/2001 | Yamada et al. | |
| 6,403,846 | B1 * | 6/2002 | Sekiya et al. | 570/134 |
| 7,067,468 | B2 | 6/2006 | DeGroot et al. | |
| 7,473,676 | B2 * | 1/2009 | Artuphel et al. | 510/407 |
| 2004/0259752 | A1 | 12/2004 | DeGroot et al. | |
| 2006/0249179 | A1 * | 11/2006 | Tsuzaki et al. | 134/10 |

FOREIGN PATENT DOCUMENTS

| | | | | |
|---|---|---|---|---|
| EP | 1 046 703 | A1 | | 10/2000 |
| JP | 2005-239958 | A | * | 2/2004 |
| WO | WO 00/56833 | | | 9/2000 |

OTHER PUBLICATIONS

PCT International Search Report and Written Opinion for International Application No. PCT/US2007/025295 dated Apr. 10, 2008.

* cited by examiner

*Primary Examiner*—Douglas Mc Ginty

(57) ABSTRACT

Disclosed is an azeotrope-like composition comprising: from about 2% by weight to about 50% by weight of a hydrofluorocarbon selected from the group consisting of 1,1,1,2,2,3,4,5,5,5-decafluoropentane and 1,1,1,3,3-pentafluorobutane, from about 2% by weight to about 50% by weight 1,1,2,2,3,3,4-heptafluorocyclopentane, and an amount effective in dissolving oils and contaminants of trans-1,2-dichloroethylene. In another embodiment, are fluorocarbon solvent composition comprising from about 15 to about 99 weight percent 1,1,1,2,2,3,4,5,5,5-decafluoropentane and from about 85 to about 1 percent by weight 1,1,2,2,3,3,4-heptafluorocyclopentane wherein the freezing point of the composition is less than 0° C.

9 Claims, 1 Drawing Sheet

AZEOTROPE-LIKE MIXTURES COMPRISING HEPTAFLUOROCYCLOPENTANE

CROSS REFERENCE(S) TO RELATED APPLICATION(S)

This application claims the benefit of priority of U.S. Provisional Application 60/874,365, filed Dec. 12, 2006.

BACKGROUND INFORMATION

1. Field of the Disclosure

This disclosure relates in general to novel azeotropic or azeotrope-like compositions useful as solvents for cleaning applications.

2. Description of the Related Art

Chlorofluorocarbon (CFC) compounds have been used extensively in the area of semiconductor manufacture to clean surfaces such as magnetic disk media. However, chlorine-containing compounds such as CFC compounds are considered to be detrimental to the Earth's ozone layer. In addition, many of the hydrofluorocarbons used to replace CFC compounds have been found to contribute to global warming. Therefore, there is a need to identify new environmentally safe solvents for cleaning applications, such as removing residual flux, lubricant or oil contaminants, and particles. There is also a need for identification of new solvents for deposition of fluorolubricants and for drying or dewatering of substrates that have been processed in aqueous solutions.

Azeotropic compositions comprising about 58-68 weight percent 1,1,1,2,3,4,4,5,5,5-decafluoropentane (HFC-43-10mee) and about 32-42 weight percent trans-1,2-dichloroethylene are described in U.S. Pat. No. 5,196,137.

Azeotropic compositions comprising about 1-50 weight percent 1,1,2,2,3,3,4-heptafluorocyclopentane (HFCP) and about 50-99 weight percent trans-1,2-dichloroethylene are described in U.S. Pat. No. 7,067,468.

Solvent compositions comprising 1,2,2,3,3,4-heptafluorocyclopentane (HFCP) and at least one organic solvent are described in U.S. Pat. No. 6,312,759.

SUMMARY

Disclosed is an azeotrope-like composition comprising: from about 2% by weight to about 50% by weight of a hydrofluorocarbon selected from the group consisting of 1,1,1,2,2,3,4,5,5,5-decafluoropentane and 1,1,1,3,3-pentafluorobutane, from about 2% by weight to about 50% by weight 1,1,2,2,3,3,4-heptafluorocyclopentane, and an amount effective in dissolving oils and contaminants of trans-1,2-dichloroethylene. In another embodiment, are fluorocarbon solvent composition comprising from about 15 to about 99 weight percent 1,1,1,2,2,3,4,5,5,5-decafluoropentane and from about 85 to about 1 percent by weight 1,1,2,2,3,3,4-heptafluorocyclopentane wherein the freezing point of the composition is less than 0° C.

The foregoing general description and the following detailed description are exemplary and explanatory only and are not restrictive of the invention, as defined in the appended claims.

BRIEF DESCRIPTION OF THE DRAWINGS

Embodiments are illustrated in the accompanying figures to improve understanding of concepts as presented herein.

Figure 1:
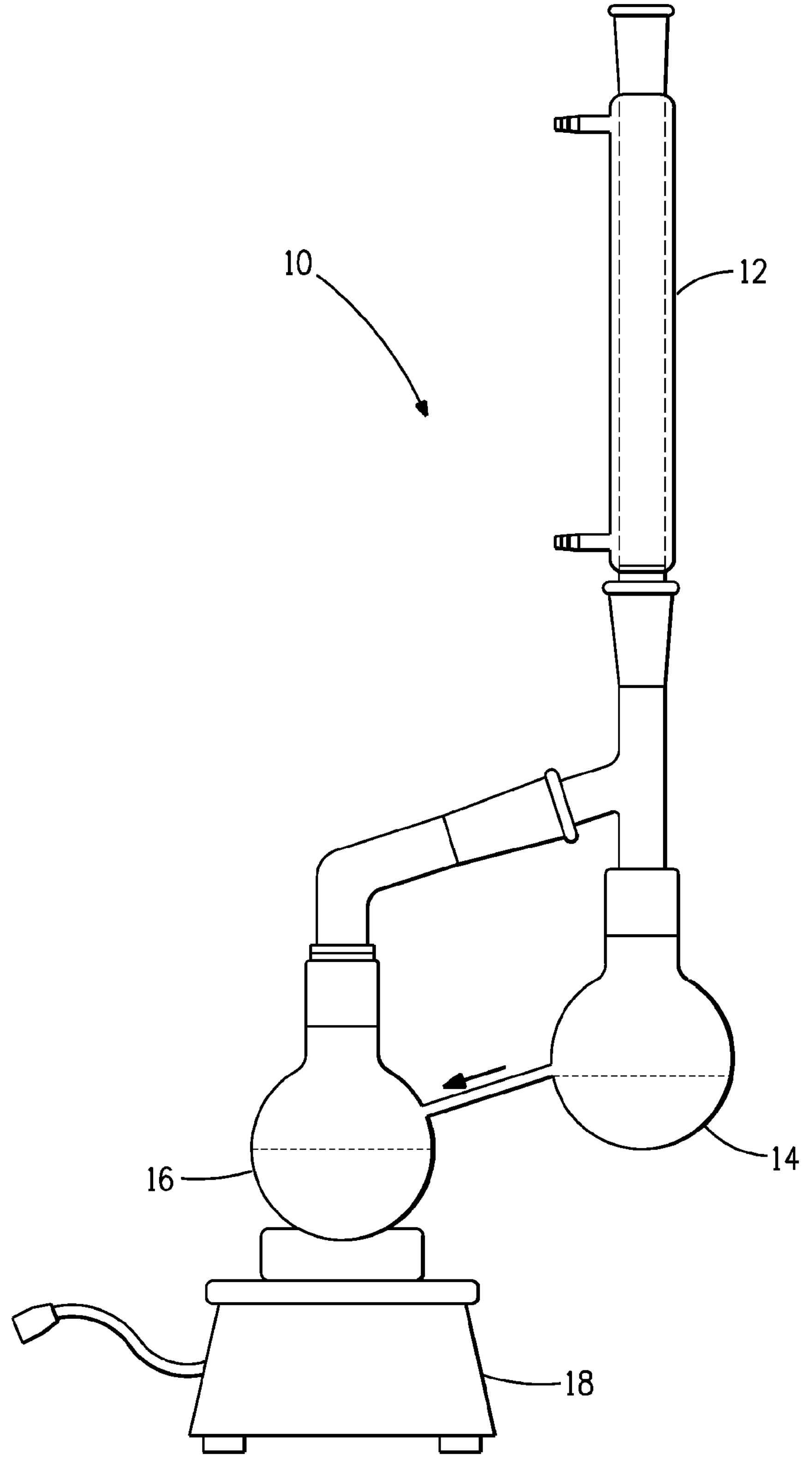
FIG. 1 includes as illustration of a dual bulb distillation apparatus used to determine compositions of constant boiling mixtures.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

The present disclosure provides new azeotropic and azeotrope-like compositions comprising hydrofluorocarbon mixtures. These compositions have utility in many of the applications formerly served by CFC compounds. The compositions of the present disclosure possess some or all of the desired properties of little or no environmental impact, ability to dissolve oils, greases or fluxes. In particular, these novel ternary azeotropic and azeotrope-like compositions offer properties not found in binary azeotropic compositions.

Disclosed is an azeotrope-like composition comprising: from about 2% by weight to about 50% by weight of a hydrofluorocarbon selected from the group consisting of 1,1,1,2,2,3,4,5,5,5-decafluoropentane and 1,1,1,3,3-pentafluorobutane, from about 2% by weight to about 50% by weight 1,1,2,2,3,3,4-heptafluorocyclopentane, and an amount effective in dissolving oils and contaminants of trans-1,2-dichloroethylene. In another embodiment, the azeotrope-like compositions further comprise from about 1% to about 6% by weight of an alcohol. In another embodiment, are fluorocarbon solvent composition comprising from about 15 to about 99 weight percent 1,1,1,2,2,3,4,5,5,5-decafluoropentane and from about 85 to about 1 percent by weight 1,1,2,2,3,3,4-heptafluorocyclopentane wherein the freezing point of the composition is less than 0° C.

Before addressing details of embodiments described below, some terms are defined or clarified.

As used herein, an azeotropic composition is a constant boiling liquid admixture of two or more substances wherein the admixture distills without substantial composition change and behaves as a constant boiling composition. Constant boiling compositions, which are characterized as azeotropic, exhibit either a maximum or a minimum boiling point, as compared with that of the non-azeotropic mixtures of the same substances. Azeotropic compositions as used herein include homogeneous azeotropes which are liquid admixtures of two or more substances that behave as a single substance, in that the vapor, produced by partial evaporation or distillation of the liquid has the same composition as the liquid. Azeotropic compositions as used herein also include heterogeneous azeotropes where the liquid phase splits into two or more liquid phases. In these embodiments, at the azeotropic point, the vapor phase is in equilibrium with two liquid phases and all three phases have different compositions. If the two equilibrium liquid phases of a heterogeneous azeotrope are combined and the composition of the overall liquid phase calculated, this would be identical to the composition of the vapor phase.

As used herein, the term "azeotrope-like composition" also sometimes referred to as "near azeotropic composition," means a constant boiling, or substantially constant boiling liquid admixture of two or more substances that behaves as a single substance. One way to characterize an azeotrope-like composition is that the vapor produced by partial evaporation or distillation of the liquid has substantially the same composition as the liquid from which it was evaporated or distilled. That is, the admixture distills/refluxes without substantial composition change. Another way to characterize an azeotrope-like composition is that the bubble point vapor pressure of the composition and the dew point vapor pressure of the composition at a particular temperature are substantially the same. Herein, a composition is azeotrope-like if, after 50 weight percent of the composition is removed such as by evaporation or boiling off, the difference in vapor pressure between the original composition and the composition remaining after 50 weight percent of the original composition has been removed by evaporation or boil off is less than 10 percent.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics,* $81^{st}$ Edition (2000-2001).

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

In one embodiment, the compositions of the disclosure comprise essentially constant boiling compositions which are azeotrope-like admixtures of a hydrofluorocarbon selected from the group consisting of 1,1,1,2,3,4,4,5,5,5-decafluoropentane (HFC-43-10mee) and 1,1,1,3,3-pentafluorobutane (HFC-365mfc), 1,1,2,2,3,3,4-heptafluorocyclopentane (HFCP) and trans-1,2-dichloroethylene (t-DCE). HFC-43-10mee is a colorless liquid having a boiling point of 53° C. HFC-365mfc is a colorless liquid having a boiling point of 40.8° C. HFCP is a white solid at ambient temperature, having a melting point of about 20° C. HFCP has a boiling point at ambient pressure of about 82° C. The compositions comprise from about 2% by weight to about 50% by weight of a hydrofluorocarbon selected from the group consisting of 1,1,1,2,2,3,4,5,5,5-decafluoropentane and 1,1,1,3,3-pentafluorobutane, from about 2% by weight to about 50% by weight 1,1,2,2,3,3,4-heptafluorocyclopentane, and an amount effective in dissolving oils and contaminants of trans-1,2-dichloroethylene.

An effective amount of trans-1,2-dichloroethylene is an amount which results in substantial solubility of common oils and other contaminants in the solvent composition. The effective amount may vary depending upon the ratio of the other components in the solvent composition, and depending upon whether or not the composition comprises an alcohol, but in all cases is readily determined with minimal experimentation. In one embodiment, when the hydrofluorocarbon is 1,1,1,2,3,4,4,5,5,5-decafluoropentane and the ratio of 1,1,1,2,3,4,4,5,5,5-decafluoropentane to 1,1,2,2,3,3,4-heptafluorocyclopentane is 1:1, an effective amount of trans-1,2-dichloroethylene is 47% by weight. In another embodiment, when the hydrofluorocarbon is 1,1,1,3,3-pentafluorobutane and the ratio of 1,1,1,3,3-pentafluorobutane to 1,1,2,2,3,3,4-heptafluorocyclopentane is 1:1, an effective amount of trans-1,2-dichloroethylene is 41% by weight.

In one embodiment, the compositions comprise an essentially constant boiling mixture comprising from about 2% by weight to about 44% by weight of 1,1,1,2,2,3,4,5,5,5-decafluoropentane, from about 2% by weight to about 50% by weight 1,1,2,2,3,3,4-heptafluorocyclopentane, and at least 47% by weight trans-1,2-dichloroethylene. In another embodiment, the compositions comprise an essentially constant boiling mixture comprising from about 10% by weight to about 50% by weight of 1,1,1,3,3-pentafluorobutane, from about 2% by weight to about 30% by weight 1,1,2,2,3,3,4-heptafluorocyclopentane, and at least 41% by weight trans-1,2-dichloroethylene.

In another embodiment, the compositions comprise an essentially constant boiling mixture comprising from about 2% by weight to about 35% by weight of 1,1,1,2,2,3,4,5,5,5-decafluoropentane, from about 2% by weight to about 30% by weight 1,1,2,2,3,3,4-heptafluorocyclopentane, and from about 54% by weight to about 90% by weight trans-1,2-dichloroethylene. In yet another embodiment, the compositions comprise an essentially constant boiling mixture comprising from about 5% by weight to about 20% by weight of 1,1,1,2,2,3,4,5,5,5-decafluoropentane, from about 5% by weight to about 20% by weight 1,1,2,2,3,3,4-heptafluorocyclopentane, and from about 60% by weight to about 88% by weight trans-1,2-dichloroethylene.

In another embodiment, the compositions comprise essentially constant boiling, azeotrope-like compositions comprising from about 1% by weight to about 10% by weight of 1,1,1,2,2,3,4,5,5,5-decafluoropentane, from about 1% by weight to about 60% by weight 1,1,2,2,3,3,4-heptafluorocyclopentane, and from about 30% by weight to about 98% by weight trans-1,2-dichloroethylene. In yet another embodiment, the compositions comprise essentially constant boiling, azeotrope-like compositions comprising from about 39% by weight to about 85% by weight of 1,1,1,2,2,3,4,5,5,5-decafluoropentane, from about 1% by weight to about 20% by weight 1,1,2,2,3,3,4-heptafluorocyclopentane, and from about 14% by weight to about 60% by weight trans-1,2-dichloroethylene.

In another embodiment, the compositions of the disclosure further comprise from about 1% by weight to about 6% by weight of an alcohol. The alcohol can be one or more alcohols selected from the group consisting of methanol, ethanol, 1-propanol, 2,-propanol and 2-methyl-2-propanol. In one such embodiment, the compositions comprise essentially constant boiling, azeotrope-like compositions comprising from about 5% by weight to about 50% by weight of 1,1,1,2,2,3,4,5,5,5-decafluoropentane, from about 5% by weight to about 50% by weight 1,1,2,2,3,3,4-heptafluorocyclopentane, at least 47% by weight trans-1,2-dichloroethylene, and from about 1% by weight to about 6% by weight of an alcohol. In another embodiment, the compositions comprise essentially constant boiling, azeotrope-like compositions comprising from about 2% by weight to about 25% by weight of 1,1,1,2,2,3,4,5,5,5-decafluoropentane, from about 2% by weight to about 20% by weight 1,1,2,2,3,3,4-heptafluorocyclopentane, from about 60% by weight to about 90% by weight trans-1,2-dichloroethylene, and from about 2% by weight to about 5% by weight of an alcohol In one embodiment, the present inventive azeotropic compositions are effective cleaning agents, defluxers and degreasers. In particular, the present inventive azeotropic compositions are useful when de-fluxing circuit boards with components such as Flip chip, μBGA (ball grid array), and Chip scale or other advanced high-density packaging components. Flip chips, μBGA, and Chip scale are terms that describe high density packaging components used in the semi-conductor industry and are well understood by those working in the field.

In another embodiment the present invention relates to a process for removing residue from a surface or substrate, comprising: contacting the surface or substrate with a composition of the present invention and recovering the surface or substrate from the composition.

In a process embodiment of the invention, the surface or substrate may be an integrated circuit device, in which case, the residue comprises rosin flux or oil. The integrated circuit device may be a circuit board with various types of components, such as Flip chips, μBGAs, or Chip scale packaging components. The surface or substrate may additionally be a metal surface such as stainless steel. The rosin flux may be any type commonly used in the soldering of integrated circuit devices, including but not limited to RMA (rosin mildly activated), RA (rosin activated), WS (water soluble), and OA (organic acid). Oil residues include but are not limited to mineral oils, motor oils, and silicone oils.

In the inventive process, the means for contacting the surface or substrate is not critical and may be accomplished by immersion of the device in a bath containing the composition, spraying the device with the composition or wiping the device with a substrate that has been wet with the composition. Alternatively, the composition may also be used in a vapor degreasing or defluxing apparatus designed for such residue removal. Such vapor degreasing or defluxing equipment is available from various suppliers such as Forward Technology (a subsidiary of the Crest Group, Trenton, N.J.), Trek Industries (Azusa, Calif.), and Ultronix, Inc. (Hatfield, Pa.) among others.

In one embodiment, there is a significant and unexpected increase in the solubility of oils and oil residues which are removed by the cleaning compositions of the present disclosure.

In another embodiment, it is useful to be able to have HFCP be a liquid at ambient temperature. Adding small amounts of other hydrofluorocarbons can produce solvent compositions which are liquid at temperatures from ambient to as low as 0° C. In one embodiment, such hydrofluorocarbons include 1,1,1,2,3,4,4,5,5,5-decafluoropentane and 1,1,1,3,3-pentafluorobutane.

Many aspects and embodiments have been described above and are merely exemplary and not limiting. After reading this specification, skilled artisans appreciate that other aspects and embodiments are possible without departing from the scope of the invention. Other features and benefits of any one or more of the embodiments herein described will be apparent from the following examples, and from the claims.

EXAMPLES

The concepts described herein will be further described in the following examples, which do not limit the scope of the invention described in the claims.

Example 1

Example 1 demonstrates an essentially constant boiling mixture of HFC-43-10mee, HFC-c447 and trans-1,2-dichloroethylene.

A solution of 33% HFC-43-10, 8% HFC-c447 and 59% trans-1,2-dichloroethylene was prepared and mixed thoroughly. The solution was placed in a dual bulb apparatus as shown in FIG. 1. One flask (the boil sump) was operated at the boiling point of the solution. The vapor condensed into the second flask (the rinse sump), which then flowed by gravity back into the first flask. The temperature of the boil sump and the composition of the rinse sump were measured over a course of 470 minutes. Results obtained are summarized in Table 1.

TABLE 1

| Sample (time) | Temp of boil sump (° C.) | % HFC-43-10mee | % HFC-c447 | % trans DCE |
|---|---|---|---|---|
| 1 | 47.6 | 43.0 | 5.4 | 51.6 |
| 2 | 47.0 | 40.4 | 6.1 | 53.5 |
| 3 | 47.2 | 39.7 | 6.3 | 54.0 |
| 4 | 46.7 | 39.3 | 6.5 | 54.2 |

Results show the boiling point and composition do not change significantly over time and therefore can be considered azeotrope-like.

Example 2

A solution of 15% HFC-43-10, 15% HFC-c447, 68% trans, 1,2-dichloroethylene and 2% Isopropyl alcohol was prepared and mixed thoroughly. The solution was placed in a dual bulb apparatus as shown in FIG. 1. One flask (the boil sump) was operated at the boiling point of the solution. The vapor condensed into the second flask (the rinse sump), which then flowed by gravity back into the first flask. The temperature of the boil sump and the composition of the rinse sump were measured over a course of 435 minutes. Results obtained are summarized in Table 2.

TABLE 2

| Sample (time) | Temp of boil sump (° C.) | % HFC-43-10mee | % HFC-c447 | % trans DCE | % IPA |
|---|---|---|---|---|---|
| 1 | 46.3 | 19.0 | 13.0 | 67.3 | 0.7 |
| 2 | 46.8 | 18.7 | 12.9 | 67.4 | 1.0 |
| 3 | 46.8 | 18.4 | 13.0 | 67.3 | 1.2 |

Results show the boiling point and composition does not change significantly over time and therefore can be considered azeotrope-like.

Example 3

A solution of 4.5% HFC-43-10, 5.0% HFC-c447, 87.5% trans 1,2-dichloroethylene and 3.0% methanol was prepared and mixed thoroughly. The solution was placed in a dual bulb apparatus as shown in FIG. 1. One flask (the boil sump) was operated at the boiling point of the solution. The vapor condensed into the second flask (the distillate sump), which then flowed by gravity back into the first flask. The temperature of the boil sump and the composition of the distillate sump were measured over a course of 390 minutes. Results obtained are summarized in Table 3.

TABLE 3

| Sample (time) | Temp of boil sump (° C.) | % HFC-43-10mee | % HFC-c447 | % trans DCE | % methanol |
|---|---|---|---|---|---|
| 1 (60 min) | 47.4 | 6.2 | 5.1 | 84.8 | 3.9 |
| 2 (270 min) | 46.5 | 5.7 | 5.2 | 85.6 | 3.5 |
| 3 (390 min) | 46.5 | 5.8 | 5.2 | 85.2 | 3.8 |

Example 4

A solution of 6.2% HFC-43-10, 6.1% HFC-c447, 87.7% trans 1,2-dichloroethylene was prepared and mixed thoroughly. The solution was placed in a dual bulb apparatus as shown in FIG. 1. The boil flask was operated at the boiling point of the solution. The vapor condensed into the second flask (the distillate flask), which then flowed by gravity back into the first flask. The temperature of the boil flask and the composition of the distillate flask were measured over a course of 480 minutes. Results obtained are summarized in Table 4.

TABLE 4

| Sample (time) | Temp of boil sump (° C.) | % HFC-43-10mee | % HFC-c447 | % trans DCE |
|---|---|---|---|---|
| 1 (120 min) | 47.7 | 9.9 | 6.9 | 83.2 |
| 2 (240 min) | 47.5 | 8.9 | 6.8 | 84.3 |
| 3 (360 min) | 48.2 | 8.9 | 6.7 | 84.4 |
| 4 (480 min) | 48.2 | 8.3 | 6.6 | 85.1 |

Example 5

A solution of 14.7% HFC-43-10, 15.0% HFC-c447 and 70.3% trans 1,2-dichloroethylene was prepared and mixed thoroughly. The solution was placed in a dual bulb apparatus as shown in FIG. 1. The boil flask was operated at the boiling point of the solution. The vapor condensed into the second flask (the distillate flask), which then flowed by gravity back into the first flask. The temperature of the boil flask and the composition of the distillate flask were measured over a course of 465 minutes. Results obtained are summarized in Table 5.

TABLE 5

| Sample (time) | Temp of boil sump (° C.) | % HFC-43-10mee | % HFC-c447 | % trans DCE |
|---|---|---|---|---|
| 1 (105 min) | 46.3 | 18.9 | 12.9 | 68.2 |
| 2 (225 min) | 47.1 | 19.6 | 12.5 | 67.9 |
| 3 (345 min) | 46.9 | 19.2 | 12.8 | 68.0 |
| 4 (465 min) | 46.6 | 18.1 | 13.2 | 68.7 |

Example 6

A solution of 42.7% HFC-365, 8.3% HFC-c447 and 49.0% trans 1,2-dichloroethylene was prepared and mixed thoroughly. The solution was placed in a dual bulb apparatus as shown in FIG. 1. The boil flask was operated at the boiling point of the solution. The vapor condensed into the second flask (the distillate flask), which then flowed by gravity back into the first flask. The temperature of the boil flask and the composition of the distillate flask were measured over a course of 480 minutes. Results obtained are summarized in Table 6.

TABLE 6

| Sample (time) | Temp of boil sump (° C.) | % HFC-365mfc | % HFC-c447 | % trans DCE |
|---|---|---|---|---|
| 1 | 39.6 | 50.1 | 3.7 | 46.2 |
| 2 | 40.0 | 49.2 | 3.9 | 46.9 |
| 3 | 40.0 | 48.7 | 4.1 | 47.2 |
| 4 | 40.0 | 48.6 | 4.2 | 47.2 |

Example 7

A solution of 10.3% HFC-365, 19.7% HFC-c447 and 70.0% trans 1,2-dichloroethylene was prepared and mixed thoroughly. The solution was placed in a dual bulb apparatus as shown in FIG. 1. The boil flask was operated at the boiling point of the solution. The vapor condensed into the second flask (the distillate flask), which then flowed by gravity back into the first flask. The temperature of the boil flask and the composition of the distillate flask were measured over a course of 460 minutes. Results obtained are summarized in Table 7.

TABLE 7

| Sample (time) | Temp of boil sump (° C.) | % HFC-365mfc | % HFC-c447 | % trans DCE |
|---|---|---|---|---|
| 1 (100 min) | 46.7 | 12.2 | 18.2 | 69.6 |
| 2 (220 min) | 46.9 | 13.4 | 16.9 | 69.7 |
| 3 (340 min) | 47.0 | 12.6 | 17.6 | 69.8 |
| 4 (460 min) | 46.9 | 12.1 | 17.9 | 70.0 |

Example 8

Example 8 demonstrates the solubility of hydraulic fluid in mixtures as a function of composition.

The solubility of ML 5606 hydraulic fluid was determined in various mixtures of HFC-43-10mee, HFCP and trans-1,2-dichloroethylene by preparing saturated solutions of hydraulic fluid in the various solvent compositions, and then allowing the solvent to evaporate to determine the weight fraction hydraulic oil. Results are summarized in Table 8.

TABLE 8

| % HFC-43-10meee | % HFCP | % trans | Solubility ML 5606 |
|---|---|---|---|
| 30 | 30 | 40 | <0.5 |
| 27.5 | 27.5 | 45 | <0.5 |
| 27 | 27 | 46 | <0.5 |
| 26.5 | 26.5 | 47 | 22 |
| 25.5 | 25.5 | 49 | 25 |
| 25 | 25 | 50 | 28 |
| 24.5 | 24.5 | 51 | >89 |

Example 9

Example 8 demonstrates the solubility of hydraulic fluid in mixtures as a function of composition.

The solubility of ML 5606 hydraulic fluid was determined in various mixtures of HFC-365mfc, HFCP and trans-1,2-dichloroethylene by preparing saturated solutions of hydraulic fluid in the various solvent compositions, and then allowing the solvent to evaporate to determine the weight fraction hydraulic oil. Results are summarized in Table 9.

TABLE 9

| % HFC-365mfc | % HFCP | % trans | Solubility ML 5606 |
|---|---|---|---|
| 30 | 30 | 40 | 0.5% |
| 29.5 | 29.5 | 41 | 33% |
| 29 | 29 | 42 | 36% |
| 28.5 | 28.5 | 43 | 38% |
| 27.5 | 27.5 | 45 | 48% |
| 27 | 27 | 46 | 90% |

Example 10

Freezing points were determined by mixtures of HFC-43-10mee and HFC-c447. Blends were prepared by weighing appropriate amounts of the two hydrofluorocarbons into sample bottles and then shaking to mix thoroughly. The samples were then placed in a storage chamber maintained at 0° C. for 24 hours, and then observed. Observations are recorded in Table 10.

TABLE 10

| Wt % HFC-43-10mee | Wt % HFC-c447 | Appearance |
|---|---|---|
| 2 | 98 | Frozen solid |
| 5 | 95 | Frozen solid |
| 8 | 92 | Frozen solid |
| 10 | 90 | Liquid with 10% solid |
| 15 | 85 | Clear liquid |

Example 11

Freezing points were determined by mixtures of HFC-365mfc and HFC-c447. Blends were prepared by weighing appropriate amounts of the two hydrofluorocarbons into sample bottles and then shaking to mix thoroughly. The samples were then placed in a storage chamber maintained at 0° C. for 24 hours, and then observed. Observations are recorded in Table 11.

TABLE 11

| Wt % HFC365mfc | Wt % HFC-c447 | Appearance |
|---|---|---|
| 0 | 100 | Solid |
| 5 | 95 | Solid w/ 5% liquid |
| 10 | 90 | Liquid w/ 10% solid |
| 15 | 85 | Liquid |
| 20 | 80 | Liquid |
| 25 | 75 | Liquid |

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:

1. An azeotrope-like composition comprising from about from about 2% by weight to about 44% by weight 1,1,1,2,2,3,4,5,5,5-decafluoropentane, from about 2% by weight to about 50% by weight 1,1,2,2,3,3,4-heptafluorocyclopentane, and at least about 47% by weight trans-1,2-dichloroethylene.

2. The azeotrope-like composition of claim 1 wherein the composition comprises from about from about 2% by weight to about 35% by weight 1,1,1,2,2,3,4,5,5,5-decafluoropentane, from about 2% by weight to about 30% by weight 1,1,2,2,3,3,4-heptafluorocyclopentane, and from about 54% by weight to about 90% by weight trans-1,2-dichloroethylene.

3. The azeotrope-like composition of claim 1 wherein the composition comprises from about 5% by weight to about 20% by weight 1,1,1,2,2,3,4,5,5,5-decafluoropentane, from about 5% by weight to about 20% by weight 1,1,2,2,3,3,4-heptafluorocyclopentane, and from about 60% by weight to about 88% by weight trans-1,2-dichloroethylene.

4. An azeotrope-like composition comprising from about from about 10% by weight to about 50% by weight 1,1,1,3,3-pentafluorobutane, from about 2% by weight to about 50% by weight 1,1,2,2,3,3,4-heptafluorocyclopentane, and at least about 41% by weight trans-1,2-dichloroethylene.

5. The azeotrope-like composition of claim 4 wherein the composition comprises from about from about 10% by weight to about 50% by weight 1,1,1,3,3-pentafluorobutane, from about 2% by weight to about 20% by weight 1,1,2,2,3,3,4-heptafluorocyclopentane, and from about 46% by weight to about 80% by weight trans-1,2-dichloroethylene.

6. The azeotrope-like composition of claim 1 further comprising from about 1% by weight to about 6% by weight of an alcohol.

7. The azeotrope-like composition of claim 6 wherein the alcohol is selected from the group consisting of methanol, ethanol, 1-propanol, 2-propanol and 2-methyl-2-propanol.

8. The azeotrope-like composition of claim 7 wherein the alcohol is 2-propanol.

9. The azeotrope-like composition of claim 6 wherein the composition comprises from about 2% by weight to about 25% by weight 1,1,1,2,2,3,4,5,5,5-decafluoropentane, from about 2% by weight to about 20% by weight 1,1,2,2,3,3,4-heptafluorocyclopentane, from about 60% by weight to about 90% by weight trans-1,2-dichloroethylene, and from about 2% by weight to about 5% by weight of an alcohol.

* * * * *